Sept. 7, 1948.   R. K. HOPKINS   2,448,886
ELECTRIC FURNACE
Filed May 19, 1945

INVENTOR
Robert K. Hopkins
BY
Virgil F. Darris
ATTORNEY

Patented Sept. 7, 1948

2,448,886

UNITED STATES PATENT OFFICE 2,448,886

ELECTRIC FURNACE

Robert K. Hopkins, New York, N. Y., assignor to The M. W. Kellogg Company, New York, N. Y., a corporation of Delaware Application May 19, 1945, Serial No. 594,704

2 Claims. (Cl. 13—9)

The present invention relates to the art of electric furnaces of the type in which electrodes are employed to discharge current through gaps intervening between said electrodes and a body of molten metal to generate metal fusing heat in and around said gaps.

In a reduction electric furnace of the general type referred to, a great deal of trouble is experienced, particularly where coke is employed as a reducing agent, because of excessive current leakage between electrodes and to ground through the conductive coke bed. To reduce this current leakage, charcoal, which is much more expensive than coke, has been used as a reducing agent because of its lower current conductivity.

One object of the present invention is to provide a new and improved method and apparatus for treating metal in an electric furnace of the electrode type with minimum of current leakage between the electrodes and to ground through a conductive bed of treating material in said furnace.

Another object of the present invention is to provide a new and improved method and apparatus for reducing metal in an electric furnace of the electrode type with minimum of or no current leakage between the electrodes and to ground through a conductive bed of reducing material in said furnace.

In carrying out certain features of the present invention, there is provided an electrically neutral electrode barrier or shield partly immersed into the slag layer below the bed of reducing material, and spaced between the electrodes in a manner to prevent current leakage between these electrodes through said bed. This shield or barrier is constructed and arranged so that it does not interfere with the feeding of the electrodes if these are consumable.

Various other objects, features and advantages of the invention will be apparent from the following particular description, and from an inspection of the accompanying drawings, in which—

Figure 1:
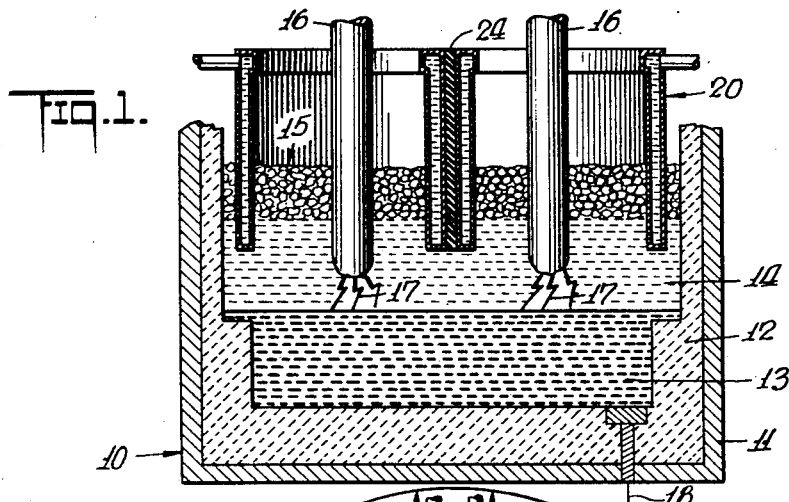
Fig. 1 is a vertical fragmentary section somewhat diagrammatic of a form of electric furnace embodying the features of the present invention, said section being taken along the lines 1—1 of Fig. 2.
Figure 2:
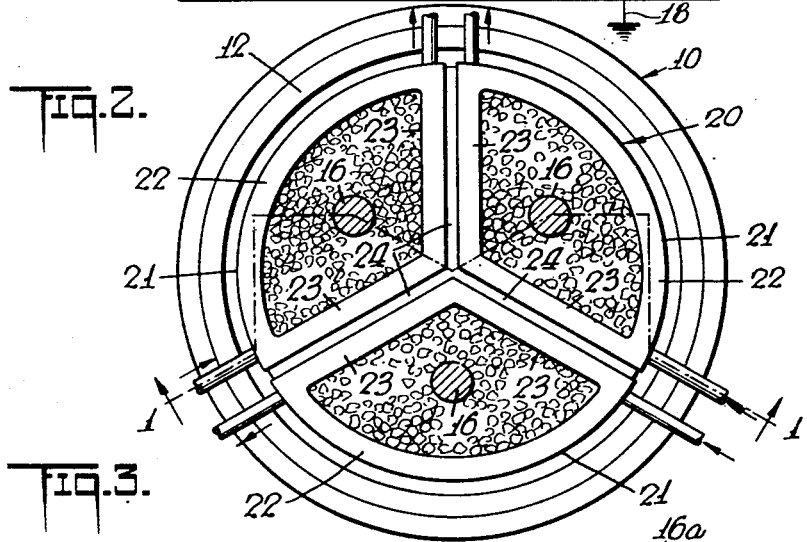
Fig. 2 is a top plan view of the fragmentary furnace structure shown in Fig. 1.

Referring to Figs. 1 and 2 of the drawings, there is shown the usual electric reducing furnace 10 provided with an outer shell 11 having a lining 12 defining a reservoir chamber where a pool 13 of molten metal is formed. The furnace 10 has the usual roof (not shown) serving to close said furnace, and to maintain a reducing atmosphere therein. Above the pool 13 of molten metal is a layer 14 of slag and flux of the usual material, and over this slag layer 14 is a bed 15 containing a charge of metal such as iron ore, and a reducing agent such as coke. Extending into the furnace 10 is a plurality of electrodes 16 which may be of consumable material such as carbon. These electrodes 16 are suspended from supports over the roof through which they project and extend into the slag layer 14 to within a predetermined distance from the pool 13 of molten metal, so as to be separated from said pool by slag submerged current discharge gaps 17. The pool 13 of molten metal is grounded as through the ground connection 18, to maintain the electric circuits of the electrodes.

Three electrodes 16 are shown equally spaced and triangularly arranged, although any number of these may be provided suitably disposed. These electrodes 16 may be operated from A. C. or D. C. current, and may, for example, be of the three-phase direct series arc type. The current may be discharged from one electrode 16 through its terminal gap 17 to the pool 13 of molten metal and back to another electrode through its terminal gap 17, or the current may be discharged in one direction through all the gaps according to the circuit set-up of the electrodes. The intensity of current discharged across the gaps 17 is sufficiently high to create metal fusing zones in and around these gaps. The material from the charge bed 15 settles through the slag layer 14, and as it comes within the fusing zones in and around the gaps 17, it is melted, reduced and partially refined by said slag layer. The reduced molten metal 13 is discharged from the furnace through the usual tap hole or gate (not shown).

As a feature of the present invention, the electrodes 16 are separated by an electrically neutral barrier 20 which prevents current leakage between the electrodes and to ground through the conductive bed 15. In the specific form shown, this barrier 20 comprises three similar intermating electrode shielding segments 21, each being of open-ended tubular form, and each having an outer peripheral circular wall 22, and two radial walls 23 arranged at an angle of about 120°. Each segment 21 is shown peripherally enclosing and electrically shielding a respective electrode 16, and may be of copper or other suitable metal hollowed for liquid cooling as shown, or, if desired, may be of refractory material. These shielding segments 21 may be arranged in any other manner to confine the stray currents from the electrodes 16 within the boundaries of said segments.

The three current confining shield segments 21 are separated between their radial walls 23 by radial spaces, and are insulated from ground as well as from any other potential by current insulation 24 in said radial spaces. These shielding segments 21 extend through the charge bed 15 and into the slag layer 14, and their outer peripheral walls 22 are spaced from the corresponding walls of the furnace 10. With this shielding arrangement, any stray currents passing from each electrode 16 through the coke or other highly conductive reducing agent in the charged bed 15 is prevented by the enclosing shield segments 21 from reaching the furnace walls, and is prevented from passing to the other electrodes 16 by the insulation 24. Current leakage which takes place between the electrodes 16 through the slag layer 14 is very slight, because of the low conductivity of said slag layer compared with the conductivity of the reducing agent in the charge bed 15.

If the metal wall of the furnace 10 opposite the shield segments 21 is bare, and if these segments are of metal construction, then the charge bed 15 is desirably confined within the outer peripheral wall of the barrier 20, as shown. Charge 15 may be deposited within the confines of this peripheral wall through the top openings of the barrier 20. With the charge bed 15 confined within the outer peripheral barrier wall, current leakage between this wall and the opposite bare metal wall of the furnace 10 above the slag layer 14 is prevented. If the barrier segments 21 are of refractory construction, or if the furnace wall opposite said barrier is refractory lined as shown, then the insulating properties of these segments or of the furnace wall lining make it unnecessary to take precautions to confine the charge bed within the outer peripheral barrier wall.

Figure 3:
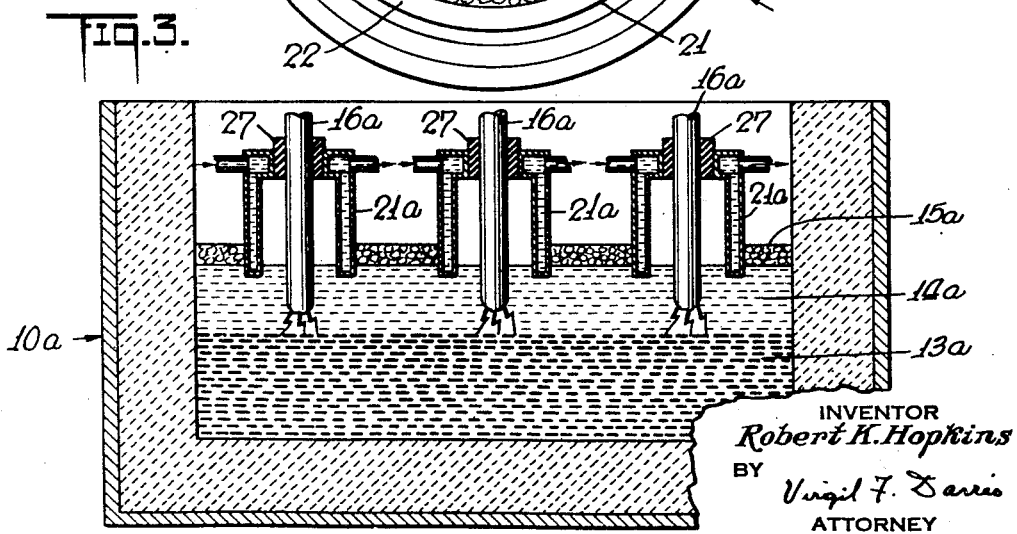
Fig. 3 is a vertical fragmentary section somewhat diagrammatic of another form of electric furnace embodying the features of the present invention.

In the form of the invention shown in Fig. 3, the lined electric furnace 10a has a pool 13a of molten metal, a slag layer 14a over said pool and a bed 15a over said slag layer containing the charge of metal to be reduced such as iron ore, and the reducing agent such as coke. The electrodes 16a of carbon or other suitable electrode material are suspended from supports over the roof through which they project, and extend into the slag layer 14a within a short distance from the metal pool 13a.

To reduce or eliminate current leakage between the electrodes 16a and to ground through the conductive charge 15a, each of said electrodes is peripherally enclosed by an individual tubular shield 21a in the form of an inverted cup which is made of copper or other suitable metal hollowed for liquid cooling as shown, or which may be of refractory material. The shield cups 21a extend in spaced relationship into the molten slag layer 14a within a short distance from the upper surface thereof, and may be supported independently of the electrodes 16a, as for example from the furnace walls, or may be supported on but insulated from respective electrodes. In the specific form shown, each of the electrodes 16a passes through the end wall of its respective cup shield 21a, and is insulated from said electrode by means of a bushing 27 of insulating material embracing said electrode with a slide fit in case said electrode is consumable.

The interiors of the shield cups 21a are free from the conductive charge 15a, so that no current flow will take place through said charge between electrodes 16a. Whatever leakage there is between the electrodes 16a is negligible, and is limited to the small amount permitted through the comparatively low conductive slag layer 14a.

As many changes can be made in the above method and apparatus, and many apparently widely different embodiments of this invention can be made without departing from the scope of the claims, it is intended that all matter contained in the above description or shown in the accompanying drawings shall be interpreted as illustrative and not in a limiting sense.

What is claimed is:

1. In an electric furnace, three metal fusing electrodes triangularly arranged and adapted to extend through a bed of conductive material, and three electrically neutral intermating closely adjoining tubular electric shields insulated from ground and other potentials and from each other, and peripherally enveloping the respective parts of said electrodes passing through the level of said bed, whereby current leakage between said electrode parts through said bed of conductive material is prevented, said shields conjointly defining an outer peripheral wall and walls extending radially inwardly therefrom.

2. In an electric furnace, three metal fusing electrodes triangularly arranged and adapted to extend through a bed of conductive material, three similar electrically neutral intermating closely adjoining tubular electric shields insulated from ground and other potentials, and peripherally enveloping the respective parts of said electrodes passing through the level of said bed, each of said shields comprising an outer circular wall and two radial side walls at an angle to each other of approximately 120°, and solid insulating material interposed between the radial walls of adjoining shields, whereby current leakage between said electrode parts through said bed of conductive material is prevented.

ROBERT K. HOPKINS.

REFERENCES CITED

The following references are of record in the file of this patent:

UNITED STATES PATENTS

| Number | Name | Date |
|---|---|---|
| 644,510 | Frost | Feb. 27, 1900 |
| 855,441 | Becket | June 4, 1907 |
| 871,338 | Heroult | Nov. 19, 1907 |
| 930,666 | Heroult | Aug. 10, 1909 |
| 1,010,001 | Snyder | Nov. 28, 1911 |
| 1,018,727 | Ruthenburg | Feb. 27, 1912 |
| 1,290,902 | Cadwell | Jan. 4, 1919 |
| 1,922,312 | Mansfield | Aug. 15, 1933 |

FOREIGN PATENTS

| Number | Country | Date |
|---|---|---|
| 21,879 | Great Britain | Nov. 13, 1894 |
| 668,428 | France | July 9, 1929 |
| 57,301 | Norway | Dec. 6, 1937 |
| 61,134 | Norway | July 17, 1939 |